United States Patent [19]

Cheon

[11] Patent Number: 5,612,731
[45] Date of Patent: Mar. 18, 1997

[54] METHOD AND APPARATUS FOR AUTOMATICALLY SETTING SPECIFIC NUMBERS OF CABLE BOXES FOR VIDEO EQUIPMENT

[75] Inventor: Myeong-geun Cheon, Anyang, Rep. of Korea

[73] Assignee: Samsung Electronic Co., Ltd., Kyungki-do, Rep. of Korea

[21] Appl. No.: 430,868

[22] Filed: Apr. 28, 1995

[30] Foreign Application Priority Data

Apr. 28, 1994 [KR] Rep. of Korea ............... 94-9154

[51] Int. Cl.$^6$ .................................................. H04N 5/50
[52] U.S. Cl. ...................................... 348/10; 386/46
[58] Field of Search ............................. 358/335, 310; 348/6, 10, 734; 455/6.1, 6.2; H04N 5/50

[56] References Cited

U.S. PATENT DOCUMENTS

| | | | |
|---|---|---|---|
| 5,303,063 | 4/1994 | Kim et al. | 358/335 |
| 5,373,330 | 12/1994 | Levine | 348/734 |
| 5,448,313 | 9/1995 | Kim et al. | 348/734 |
| 5,455,636 | 10/1995 | Furrey et al. | 348/731 |

*Primary Examiner*—John K. Peng
*Assistant Examiner*—Nathan Joseph Flynn
*Attorney, Agent, or Firm*—Sughrue, Mion, Zinn, Macpeak & Seas

[57] ABSTRACT

An apparatus automatically sets a specific number for video equipment corresponding to a cable box which is connected to the video equipment. The cable box outputs an externally supplied cable broadcasting signal if its stored specific predetermined number is identical to cable box number supplied by the apparatus. The apparatus has a sync detector which receives an output of the cable box and generates a sync detection signal indicating whether a sync signal of a video signal is detected. A controller stores a plurality of predetermined cable box numbers, and outputs each of the predetermined cable box numbers sequentially to a cable box in response to the sync detection signal supplied from the sync detector. If the sync detector detects a sync signal, the controller sets a specific number of the installed cable box corresponding to the number which was output. Thus, the specific number of the cable box is automatically set in the video equipment.

7 Claims, 2 Drawing Sheets

5,612,731

METHOD AND APPARATUS FOR AUTOMATICALLY SETTING SPECIFIC NUMBERS OF CABLE BOXES FOR VIDEO EQUIPMENT

BACKGROUND OF THE INVENTION

1. Field of the Invention

The present invention relates to a method for automatically setting video equipment according to a specific number associated with a cable box and, more particularly, to a method for automatically searching and setting a specific number of a cable box which is connected to video equipment such as a television set or a VCR. A corresponding apparatus for automatically setting a specific number needed to operate video equipment.

The instant application is based on Korean Patent Application No. 94-9154, which is incorporated herein by reference for all purposes.

2. Description of Related Art

A cable television (CATV) system has been developed wherein programs recorded on video tape are reproduced in a CATV center and are then transmitted to subscribers via cable. According to another type of CATV system, electromagnetic waves carrying reproduced programs are transmitted from satellites and are received by a community reception antenna to be transmitted to subscribers via cable. This CATV system makes it possible to easily distribute a live broadcast such as sports, news, or music to subscribers.

According to a CATV system in use in the U.S., a CATV center receives broadcast signals via communication satellites and distributes the received broadcast signals to subscribers via cable; the broadcast signals are supplied via eight channels. A CATV broadcast has been commercialized in Japan which uses commercial communication satellites (JCSAT and SCS). A communication system which combines a communication satellite with a CATV system is being developed in Korea. In such a CATV broadcast system, a subscriber uses a cable box for receiving a particular cable broadcast signal. The cable broadcast signal is regenerated by video equipment such as a TV or VCR, so that a user can view it.

The data format of cable boxes varies slightly according to the manufacturer. As a result, in order to receive cable broadcasts via the cable box, the user must set the video equipment with a specific number associated with the cable box which is used to receive the broadcast signals. Thus, the user must memorize at least one specific number with respect to a cable box or cable boxes to be used, and the user must further manually set the video equipment according to the specific number associated with the cable box.

SUMMARY OF THE INVENTION

Therefore, to solve the above problem, it is an object of the present invention to provide a method for automatically searching and then setting in video equipment a specific number of a cable box, which has to be set manually by a user.

It is another object of the present invention to provide an apparatus for automatically searching and setting a specific number of a cable box in video equipment.

To accomplish the above object of the present invention, there is provided a method for automatically setting a specific number of a cable box for video equipment, the method comprising the steps of:

(a) generating one of a plurality of predetermined cable box numbers and supplying the generated cable box number to a cable box, in order to receive a cable broadcast signal from the cable box for outputting a received cable broadcast signal if a stored specific number is identical to an externally supplied cable box number;

(b) detecting a sync signal of a video signal from a signal outputted from the cable box in response to the cable box number generated in step (a), and judging whether the sync signal is detected based on the detection result;

(c) repetitively performing steps (a) and (b) with respect to each cable box number until a plurality of cable box numbers which are not generated in step (a) are used for sync signal detection, if it is judged that the sync signal has not been detected in step (b); and (d) setting the cable box number corresponding to the sync signal as a specific number of a cable box for use in video equipment if it is judged that the sync signal has been detected in step (b).

To accomplish the other object of the present invention, there is provided an apparatus for automatically setting a specific number of a cable box for video equipment, the apparatus comprising:

a sync detector coupled to receive an output signal of a cable box and generating a sync detection signal indicating whether a sync signal of a video signal is detected from the received signal, in order to receive a cable broadcast signal from the cable box for outputting a received cable broadcast signal if a stored specific number is identical to an externally supplied cable box number; and a controller for storing a plurality of predetermined cable box numbers, and selectively performing one between an operation of outputting each one of the stored plurality of the cable box numbers sequentially to a cable box in response to the sync detection signal supplied from the sync detector, and another operation of setting a specific number of the cable box for use in the video equipment.

DETAILED DESCRIPTION OF THE PREFERRED EMBODIMENT

A preferred embodiment of the present invention will be described below in more detail with reference to the accompanying drawings.

Figure 1:
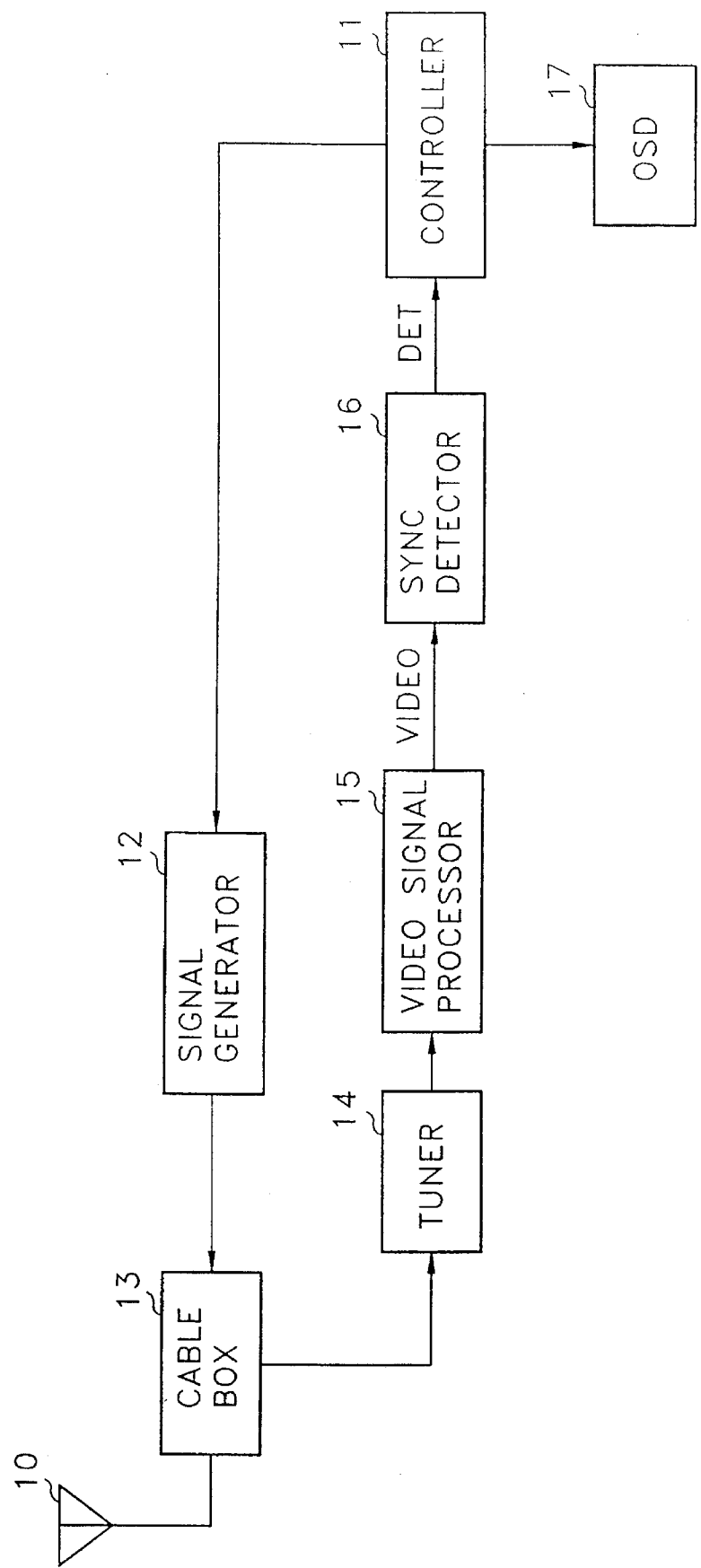
FIG. 1 is a block diagram of an apparatus for automatically setting a specific number of a cable box for use in video equipment according to a preferred embodiment of the present invention.

FIG. 1 shows an apparatus for automatically setting a specific number of a cable box according to a preferred embodiment of the present invention. The automatic specific number setting apparatus according to the present invention comprises a cable box 13 for receiving either a signal via an antenna 10 or cable broadcasting signals transmitted via cable (not shown). A tuner 14 receives an output signal of a cable box 13 and selects a broadcasting signal of a particular channel among cable broadcasting channels. A video signal processor 15 processes a video signal of the channel selected by tuner 14. A sync detector 16 generates a sync detection signal DET indicating whether a sync signal is detected or not using the video signal VIDEO applied from video signal processor 15, and supplies the generated sync detection signal DET to a controller 11. Controller 11 generates control data according to sync detection signal DET and controls a signal generator 12 and an on-screen-display (OSD) 17, respectively. Signal generator 12 generates a signal corresponding to first control data CTL1 of controller 11 and supplies the generated signal to cable box 13. OSD 17 displays a specific number or a warning statement which has been set in cable box 13 in response to second control data CTL2 of controller 11.

Assuming cable box 13 has a specific number "09" and controller 11 stores cable box number N from "00" to "M," an operation of the FIG. 1 apparatus will be described below.

In a mode for automatically setting a specific number of cable box 13, controller 11 generates cable box number N from "00" to "M" and first control data having other additional control data for channel selection, etc., and supplies the generated cable box number N and the first control data to signal generator 12. Signal generator 12 generates a signal corresponding to cable box number N and the first control data and supplies the generated signal to cable box 13. The type of signal generated in signal generator 12 is determined by a physical signal transmission and reception type in cable box 13 and signal generator 12. For example, if cable box 13 and signal generator 12 are constructed to transmit and receive a signal using infrared light, signal generator 12 generates an infrared signal corresponding to the first control data. When cable box number N of "00" is supplied from signal generator 12, cable box 13 compares whether supplied cable box number N is identical to its own specific number. As a result of the comparison, if cable box number N is not the same as the specific number, cable box 13 cannot operate as a converter. Thus, cable box 13 cannot supply a cable broadcasting signal to tuner 14. Sync detector 16 generates sync detection signal DET indicating whether a sync signal is detected using the signal supplied from video signal processor 15, and supplies the generated sync detection signal DET to controller 11. In this case, sync detection signal DET supplied to controller 11 has information that no sync signal has been detected. Controller 11 generates next cable box number N of "01" and the first control data based on the received sync detection signal DET. Signal generator 12 generates a signal corresponding thereto and supplies the generated signal to cable box 13. By repeating such operations, if controller 11 generates cable box number N of "09," cable box 13 judges that the received cable box number N is the same as the specific number stored therein. Accordingly, cable box 13 processes the received cable broadcasting signal according to the first control data together with the cable box number N of "09" and supplies the processed signal to tuner 14. In this case, sync detector 16 generates sync detection signal DET having information that a sync signal has been detected, and controller 11 generates the first control data having cable box number N of "09" to control cable box 13. Controller 11 controls OSD 17 to display the identified specific number of cable box 13, if it is judged from sync detection signal DET that a sync signal has been detected from the received signal. If the specific number of cable box 13 is larger than "M" controller 11 generates second control data and supplies the generated second control data to OSD 17, which displays a warning statement which informs a user to consult a user's manual in response to the second control data.

Figure 2:
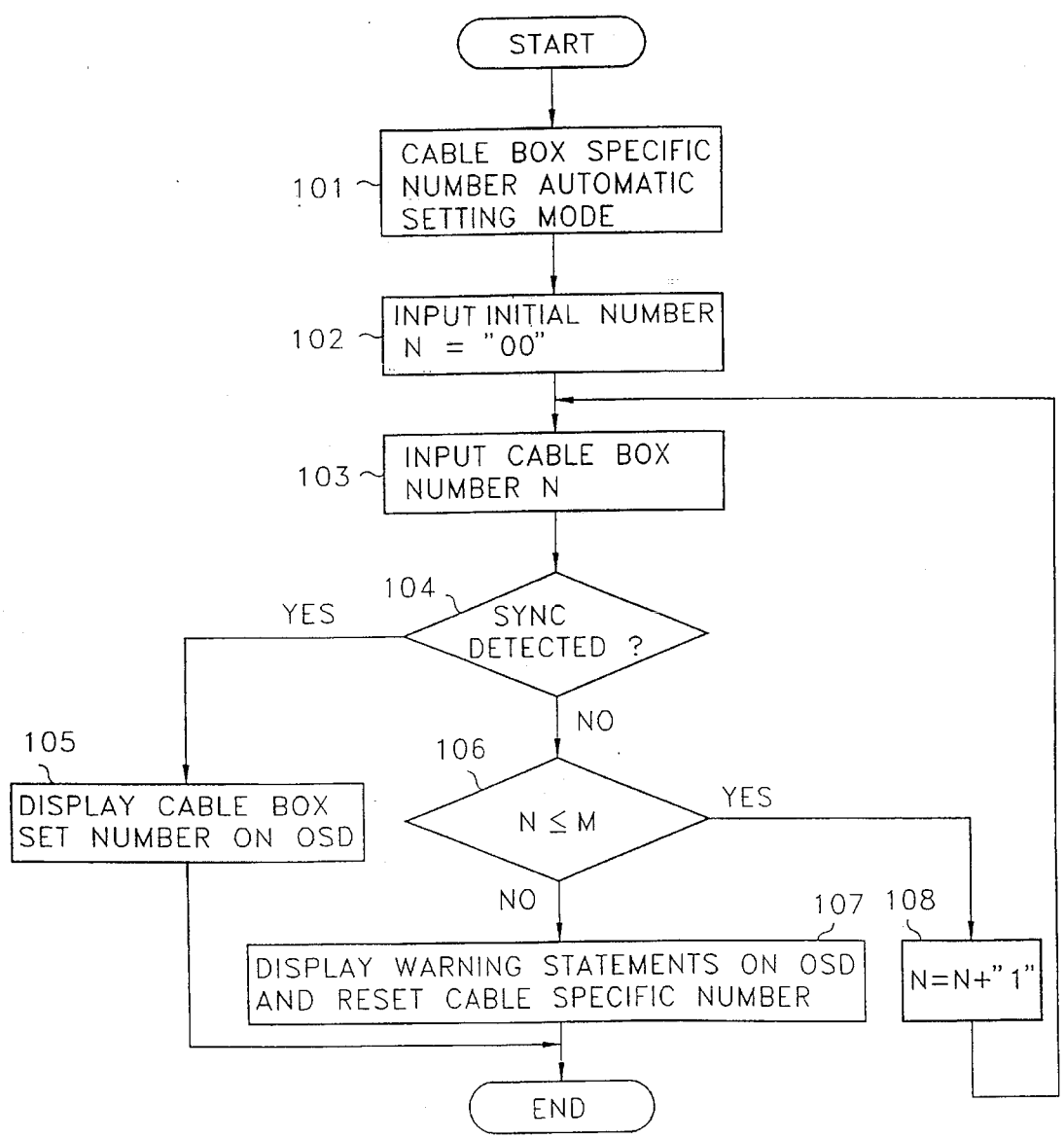
FIG. 2 is a flowchart diagram for explaining a controller of the FIG. 1 apparatus.

FIG. 2 is a flowchart diagram for explaining an operation of controller 11 of the FIG. 1 apparatus. If cable box 13 is connected to tuner 14, controller 11 starts an operation for automatically setting a specific number of cable box 13 in step 101. Controller 11 sets an initial cable box number N as "00" in step 102. Controller 11 generates first control data together with the cable box number N and supplies the first control data to signal generator 12 in step 103. If sync detector 16 generates sync detection signal DET based on the input video signal, controller 11 judges whether a sync signal is detected from the signal supplied to tuner 14 from cable box 13 in correspondence to cable box number N of "00" using the received sync detection signal DET in step 104. If it is judged that the sync signal has not been detected in step 104, controller 11 judges whether cable box number N is less than or equal to the maximum cable box number M in step 106. If it is judged that cable box number N is less than or equal to the maximum cable box number M in step 106, controller 11 increases cable box number N by one in step 108, and then performs steps 103 to 108. A loop having steps 103, 104, 106 and 108 is repeatedly performed, and if it is judged that the sync signal has been detected in step 104, controller 11 generates second control data to control OSD 17 to display the specific number of cable box 13 on a screen. On the other hand, when the sync signal has not been detected in step 104 and cable box number N is larger than the maximum cable box number data M stored therein in step 106, controller 11 generates second control data for controlling OSD 17 to display a warning statement such as "Refer to User's Manual for Resetting the Cable Box Specific Number".

As described above, the present invention provides an apparatus and method for automatically setting a specific number of a cable box, to thereby enable a user to conveniently receive a cable broadcasting signal by means of an automatic search of the cable box specific number compared with the conventional art where the user must memorize a specific number of a cable box which receives cable broadcasting.

While only certain embodiments of the invention have been specifically described herein, it will be apparent that numerous modifications may be made thereto without departing from the spirit and scope of the invention.

What is claimed is:

1. An apparatus for automatically setting a specific number of a cable box for video equipment, the apparatus comprising:

sync detector means for receiving an output signal of a cable box and for generating a sync detection signal indicating whether a sync signal of a video signal has been detected from the received signal; and controller means for storing a plurality of predetermined cable box numbers, and for outputting each one of the stored plurality of cable box numbers sequentially to a cable box in response to the sync detection signal supplied from said sync detector means, and for setting a specific number of the cable box for use in the video equipment in response to the sync detection signal, so that the video equipment receives a cable broadcast signal from the cable box when a stored specific number is identical to an externally supplied cable box number.

2. The apparatus according to claim 1, wherein said controller means outputs another cable box number which has not been outputted when the sync detection signal indicates that the sync signal has not been detected, while said controller means sets a cable box number corresponding to the detected sync signal as a specific number of said cable box when the sync detection signal indicates that the sync signal has been detected.

3. The apparatus according to claim 2, further comprising an on-screen-display (OSD), wherein said controller means controls said OSD to display the specific number of the cable box when the specific number of the cable box is identified.

4. The apparatus according to claim 3, wherein said controller means controls said OSD to display information indicating that a specific number of said cable box has not been set, if the sync detection signal indicating that the sync signal has not been detected is applied from said sync detector means after all of the plurality of the predetermined cable box numbers have been output to said cable box.

5. A method for automatically setting a specific number of a cable box for video equipment, said method comprising the steps of:

(a) generating one of a plurality of predetermined cable box numbers and supplying the generated cable box number to a cable box, in order to receive a cable broadcast signal from the cable box for outputting a received cable broadcast signal if a stored specific number is identical to an externally supplied cable box number;

(b) detecting a sync signal of a video signal from a signal outputted from the cable box in response to the cable box number generated in step (a), and judging whether the sync signal is detected based on the detection result;

(c) repetitively performing steps (a) and (b) with respect to each of the plurality of cable box numbers until each of the plurality of cable box numbers which are generated in step (a) is used for sync signal detection, if it is judged that the sync signal has not been detected in step (b); and (d) setting the cable box number corresponding to the sync signal as a specific number of a cable box for use in the video equipment if it is judged that the sync signal has been detected in step (b).

6. The method for automatically setting a specific number of a cable box for video equipment according to claim 5, further comprising the step of displaying a warning statement indicating that a specific number of said cable box has not been set for use in said video equipment via an on-screen-display (OSD), if said step (c) is performed with respect to each of said plurality of the predetermined cable box numbers and a sync signal has not been detected.

7. The method for automatically setting a specific number of a cable box for video equipment according to claim 5, further comprising the step of displaying a set specific number of said cable box via an on-screen-display (OSD) if the specific number of said cable box has been set for use in said video equipment in step (d).

* * * * *